United States Patent [19]

Kulak

[11] 4,424,661
[45] Jan. 10, 1984

[54] ANTI-WINDROWING ATTACHMENT FOR A ROTARY CUTTER

[75] Inventor: John Kulak, Port Colborne, Canada

[73] Assignee: Deere & Company, Moline, Ill.

[21] Appl. No.: 390,499

[22] Filed: Jun. 21, 1982

[51] Int. Cl.³ .............................................. A01D 55/18
[52] U.S. Cl. ..................... 56/320.2; 56/13.6; 56/17.4
[58] Field of Search .................... 56/6, 13.6, 17.4, 192, 56/255, 295, 314, 320.1, 320.2

[56] References Cited

U.S. PATENT DOCUMENTS

| | | | |
|---|---|---|---|
| 3,157,014 | 11/1964 | Bottenberg | 56/6 |
| 3,469,376 | 9/1969 | Bacon | 56/6 |
| 3,818,687 | 6/1974 | Houst et al. | 56/255 |
| 4,099,366 | 7/1978 | Peterson | 56/13.6 |
| 4,117,653 | 10/1978 | Tarver, Jr. | 56/13.6 |
| 4,205,512 | 6/1980 | Thorud | 56/13.4 |

FOREIGN PATENT DOCUMENTS 927110  5/1973  Canada ................... 56/13.6

OTHER PUBLICATIONS

John Deere, 1508 Rotary Cutter Operator's Manual Serial No. 14,001–), Welland, OM-W21448, Issue 18 (Sep. 1978) pp. 1, 35 and 41.

Primary Examiner—John J. Wilson
Assistant Examiner—David L. Tarnoff

[57] ABSTRACT

In a rotary cutter having counterrotating rotors, deflectors positioned on the side frame housing for directing some of the cut material downwardly, rather than towards the center of the machine, to create a uniform discharge pattern across the width of the machine.

11 Claims, 4 Drawing Figures

4,424,661

ANTI-WINDROWING ATTACHMENT FOR A ROTARY CUTTER

BACKGROUND OF THE INVENTION

The present invention relates generally to rotary cutters and more specifically to structure for preventing windrowing of the material cut by a rotary cutter.

Dual-rotor rotary cutters adapted for towing behind a tractor typically utilize counterrotating blades so that material bent forwardly by the tractor wheels will be approached by a blade having a rearward component of travel to assure that the bent material is effectively cut. The counterrotating blades, however, direct the cut material to the center of the machine at the rear to form a windrow. In most instances, windrowing is undesirable and hampers drying of the cut material, mats the uncut material and causes streaking in the cut field. In fields that are to be plowed or disked, windrowing causes excessive blocking of the tillage implements. Rotating both blades in the same direction reduces windrowing but also results in uneven and ineffective cutting of the material in at least one of the tractor wheel tracks.

Various types of dividers and baffles have been proposed to control windrowing, and examples of such may be found in U.S. Pat. Nos. 4,117,653; 4,099,366; 3,469,376 and 3,157,014. The available dividers and baffles are relatively large or complex, are easily damaged or rendered ineffective, and are often the cause of material build-up around the mower deck.

It is therefore a principal object of the present invention to provide an improved rotary mower which overcomes the above-mentioned problems.

It is another object of the present invention to provide an improved multi-blade rotary mower which effectively prevents windrowing of the mowed material.

It is yet another object to provide simple, economical and non-clogging baffle structure for a rotary mower which prevents windrowing and causes even distribution across the entire width of cut of the mower.

These and other objects, features and advantages of the present invention will become apparent to those skilled in the art from the description which follows and from the drawings.

DESCRIPTION OF THE PREFERRED EMBODIMENT

Figure 1:
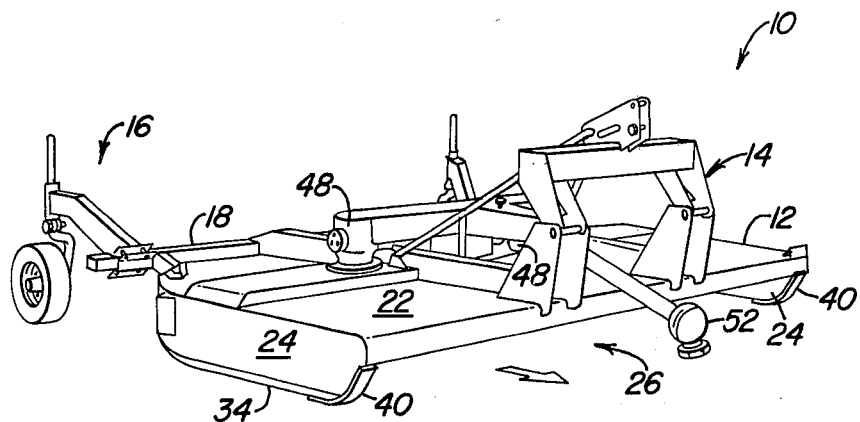
FIG. 1 is a front perspective view of a rotary cutter.

Referring to FIG. 1, therein is shown a rotary cutter 10 having a main body 12 adapted for towing forwardly over the ground by a towing vehicle (not shown) connected thereto by three-point hitch structure 14 or other conventional means. Rear wheel assemblies 16 support the aft end of the cutter 10 and are laterally movable on a rear transverse beam 18 to adjust wheel tread.

The main body 12 includes generally horizontal upper deck structure 22. Side housing structure 24 extends downwardly on each side of the deck structure 22 to form therewith a cutting compartment, indicated generally at 26, which opens in the downward and rearward directions. The side housing structure 24 curves inwardly (FIG. 3) in a generally arc-shaped configuration at outer rear locations 30. Lower edges 32 (FIG. 2) at the locations 30 angle upwardly from fore-and-aft extending horizontal flanges 34 so that the distance between the ground and the lower edge 32 of the rear opening, indicated at 36, increases from the side toward the rear of the implement 10.

Forward ground-engaging shoes 40 are connected to the front edges of the side structures 24. The shoes 40 cooperate with the flanges 34 to act as height-gauging slides to maintain the mower blades above the surface of the ground.

A pair of rotary cutting blades 44 are journalled for rotation in the cutting compartment 26 on vertical shafts 46 which extend upwardly through the deck 22. The shafts 46 are connected to gearboxes 48 which in turn are driven in a conventional manner from a PTO 52 connected to the tractor PTO shaft.

The blades 44 are rotated in the direction of arrows 56 (FIG. 3) about the axes of the vertical shafts 46, preferably about ninety degrees out of phase with each other, and define cutting areas which extend between the side structures 24. The blades 44 are rotated in opposite directions so that there is a substantial rearward component of velocity adjacent the side structures 24. The rearward component provides more effective cutting of material pushed down in the forward direction by the tractor wheels. However, the counterrotating blades 44 also carry cut material toward the center of the rear opening 36 thereby increasing the tendency of the cutter 10 to cause windrowing.

Figure 4:
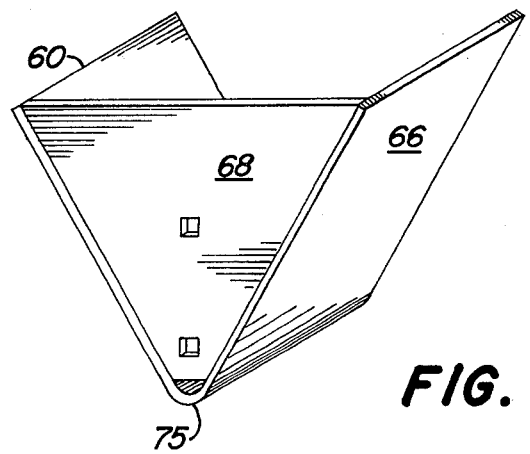
FIG. 4 is a perspective view of one of the deflectors shown in FIGS. 2 and 3.

To reduce windrowing, deflectors 60 and 62 are provided between the respective portions 30 and the paths of the radially outermost edges of the corresponding blades 44. Each of the deflectors 60 and 62 includes a V-shaped member 66 (FIG. 4), and an apertured triangular plate 68 welded to the edges of one side of the member 66. The deflector 62 is shorter than the deflector 60 and has only one aperture in the plate 68.

Figure 2:
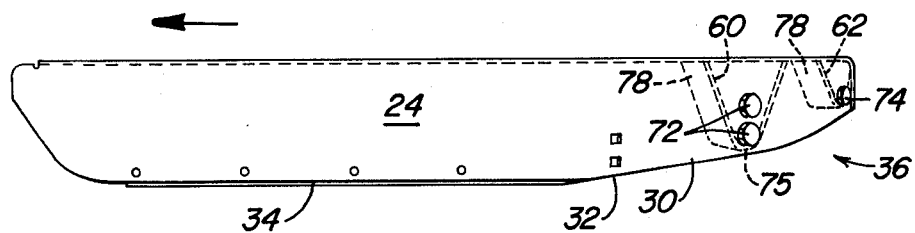
FIG. 2 is a side view of the housing structure of the cutter of FIG. 1 showing the location of the deflectors of the present invention.
Figure 3:
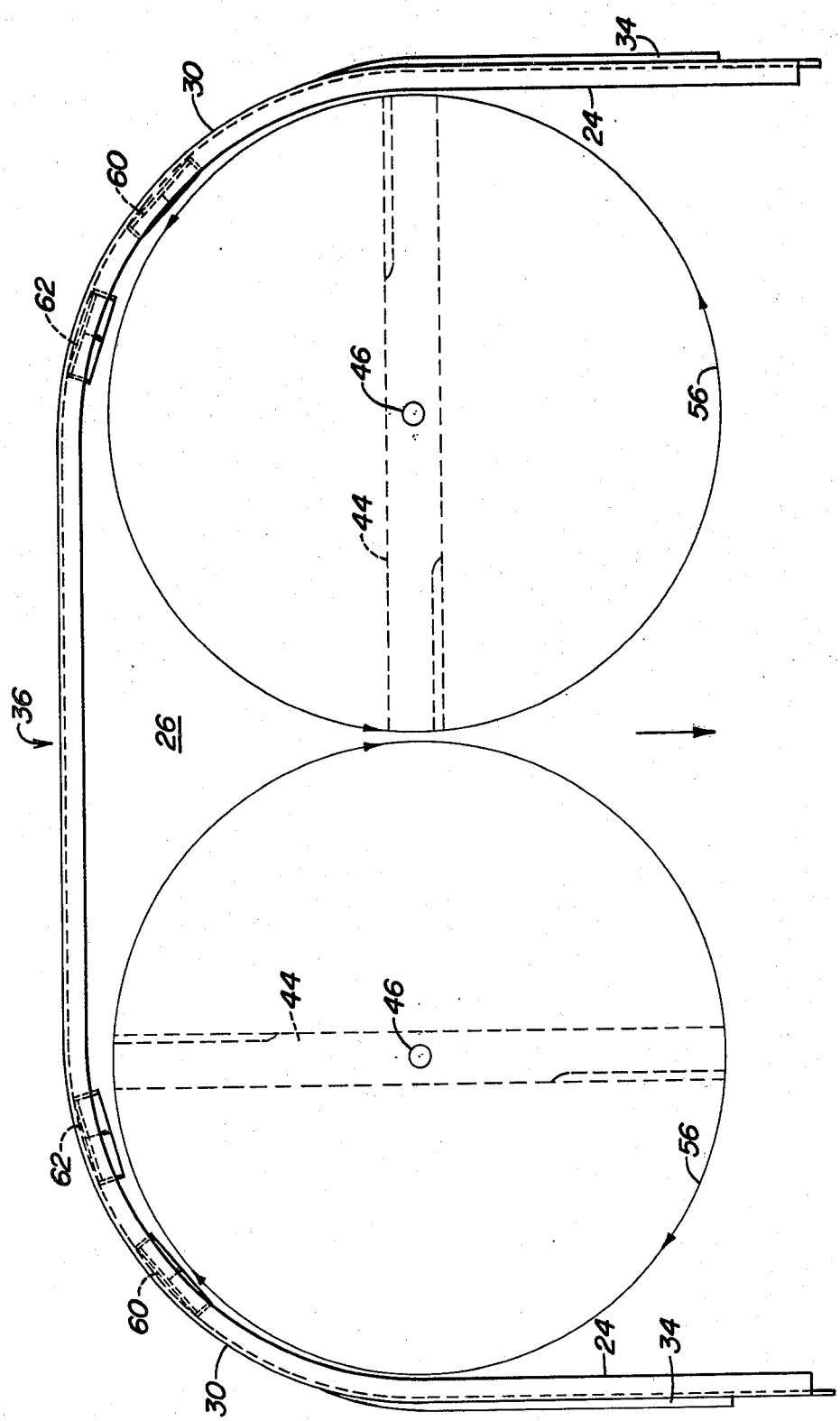
FIG. 3 is a top view of the mower of FIG. 1 with portions removed to show the path of the mower blades and the locations of the deflectors.

Each of the deflectors 60 is connected to the side structure 24 by a pair of bolts 72. Each of the deflectors 62 is connected rearwardly and inwardly of the corresponding deflector 60 by a single bolt 74. As best seen in FIG. 2, the deflectors 60 and 62 extend from the deck 22 to the lower edge 32 and present forwardly and downwardly directed deflecting surfaces 78 adjacent the blades 44. The V-shaped members 66 abut against the deck 22 and the side structures 24 and have an apex 75 aligned with the lower edge 32. In the preferred embodiment the deflectors 60 and 62 are offset rearwardly approximately forty-six degrees and seventy-five degrees, respectively, from a horizontal transverse axis passing through the axes of the shafts 46, although other locations could also be used.

The deflector surfaces 78 intercept a portion of the material cut by the blades 44 and direct it downwardly toward the ground to reduce the amount which is carried by the rotation of the blades toward the center of the rear opening 36. The above-described arrangement has been found to eliminate windrowing and provide a very uniform distribution of material across the width of the cutter 10. The deflectors 60 and 62 are relatively inexpensive, compact and sturdy, and are less easily damaged and less likely to cause blockages than most other devices utilized to control the flow of cut material.

Having described the preferred embodiment, it will be apparent that modifications can be made without departing from the scope of the invention as defined in the accompanying claims.

I claim:

1. In a rotary agricultural mower adapted for forward movement over the ground where material to be cut is present, a main housing including upper deck structure; side structures extending downwardly from a least one side of the deck structure and cooperating therewith to form a cutting compartment opening in a preselected direction with respect to the forward direction of travel; a pair of rotary cutting blades journalled in the deck structure for rotation in horizontal planes about upright axes; drive means for rotating the blades in opposite directions about the axes whereby each of the blades passes the side structure and directs material cut by rotation of the blade to the opening and out the compartment, the rotation of the blade causing cut material to flow more heavily toward the center of the cutting compartment; and means for preventing windrowing of the cut material near said center of the cutting compartment comprising a deflector supported inwardly adjacent the side structure and radially outwardly of the path defined by the radially outermost edge of one of the blades, said deflector including a downwardly directed surface for intercepting a portion of the cut material and directing said intercepted material downwardly to the ground near the side structure and away from the blade before the material flows to said center of the cutting compartment.

2. The invention as set forth in claim 1 wherein the side structure includes a lower edge and the deflector extends downwardly from the deck structure to the lower edge.

3. The invention as set forth in claim 2 wherein the deflector comprises a V-shaped member having an apex located adjacent the lower edge.

4. The invention as set forth in claim 1 or 3 further comprising a second deflector offset angularly in the direction of rotation from the first-mentioned deflector.

5. In a rotary agricultural mower adapted for forward movement over ground where material to be cut is present, a main housing including upper generally horizontal deck structure; side housing structures extending downwardly from either side of the deck structure and forming therewith a cutting compartment open in the downward and rearward directions; a pair of rotary cutting blades journalled in the deck structure for rotation about transversely spaced upright axes and defining cutting areas extending between the side housing structures; drive means for rotating the blades in opposite directions about the axes so that the blades pass in the rearward direction relative to the side housings to thereby direct cut material towards the center of the rearward opening and out of the cutting compartment; and means for preventing windrowing of the cut material near the center of the rearward opening, said means comprising a deflector supported inwardly adjacent each side housing structure, said deflector located substantially entirely radially outwardly of the cutting area in the quadrant of the mower housing bounded by a horizontal axis extending outwardly in the transverse direction and horizontal axis extending rearwardly in the fore-and-aft direction, both said axes intersecting the corresponding shaft axis, and wherein said deflector includes a downwardly directed surface for directing a portion of the cut material towards the ground adjacent the side housings outwardly of the path of rotation of the blades.

6. The invention as set forth in claim 5 further comprising a second deflector offset angularly in the direction of rotation from the first deflector.

7. The invention as set forth in claim 5 or 6 wherein the deflectors comprise V-shaped members opening upwardly toward the deck structure.

8. The invention as set forth in claim 7 wherein the V-shaped members abut against the deck structure and the corresponding side structure.

9. The invention as set forth in claim 7 wherein the apex of the V-shaped member is located immediately adjacent the lower edge of the side structure.

10. The invention as set forth in claim 6 wherein the first deflector is located approximately forty-six degrees rearwardly of the transverse axis.

11. The invention as set forth in claim 9 wherein the lower edge of the side structure angles upwardly in the direction of rotation.

* * * * *

UNITED STATES PATENT AND TRADEMARK OFFICE
CERTIFICATE OF CORRECTION

PATENT NO. : 4,424,661
DATED : 10 January 1984
INVENTOR(S) : John Kulak

It is certified that error appears in the above-identified patent and that said Letters Patent is hereby corrected as shown below:

Column 3, line 13, delete "a" and insert -- at --.

Signed and Sealed this

Eleventh Day of September 1984

[SEAL]

Attest:

GERALD J. MOSSINGHOFF

Attesting Officer    Commissioner of Patents and Trademarks